United States Patent [19]

Alanis et al.

[11] Patent Number: 4,575,423

[45] Date of Patent: Mar. 11, 1986

[54] DEBRIS COLLECTION BAG FOR POOL CLEANERS

[75] Inventors: J. Jesus Alanis, San Marcos; Paul Greskovics, Manhattan Beach, both of Calif.

[73] Assignee: Alopex Industries, Inc., San Marcos, Calif.

[21] Appl. No.: 667,220

[22] Filed: Nov. 1, 1984

[51] Int. Cl.$^4$ ............................................. B01D 35/00
[52] U.S. Cl. ....................................... 210/169; 15/1.7
[58] Field of Search .................... 210/169, 416.2, 459, 210/460; 15/1.7; 134/168 R

[56] References Cited

U.S. PATENT DOCUMENTS

| | | | |
|---|---|---|---|
| 3,822,754 | 7/1974 | Henkin et al. | 15/1.7 |
| 3,936,899 | 2/1976 | Henkin et al. | 134/168 |
| 3,972,339 | 8/1976 | Henkin et al. | 134/168 R |
| 4,481,117 | 11/1984 | Collins | 210/169 |

OTHER PUBLICATIONS 4 pages of advertising literature of Polaris Vac-Sweep, P.O. Box 1149, San Marcos, CA, 92069, printed Dec. 1983.

*Primary Examiner*—Richard V. Fisher
*Assistant Examiner*—Sharon T. Cohen
*Attorney, Agent, or Firm*—Fulwider, Patton, Rieber, Lee & Utecht

[57] ABSTRACT

An improved collection bag is provided for mounting onto a swimming pool cleaner of the type for traveling along submerged pool surfaces to dislodge and collect debris, wherein the improved collection bag is designed particularly for use in collecting relatively large debris, such as leaves, twigs, and the like. The collection bag is formed from relatively open mesh fabric to have a generally L-shaped configuration including a generally upright forward leg defining a lower open mouth for mounting onto the discharge end of a pool cleaner suction mast, and blending at its upper end with a generally horizontal rear leg releasably suspended from a water supply hose for the pool cleaner by a suspension strap. In use, water and debris suctioned by the pool cleaner flow upwardly into a forward flow chamber within the bag, with the debris guiding rearwardly incident to forward travel of the pool cleaner into a rear collection chamber within the bag rear leg for collection and storage. A split seam generally at the rear of the collection bag and defined, for example, by separable Velcro-type fastener strips may be opened to permit debris removal from the collection chamber without requiring bag removal from the pool cleaner.

18 Claims, 6 Drawing Figures

DEBRIS COLLECTION BAG FOR POOL CLEANERS

BACKGROUND OF THE INVENTION

This invention relates generally to improvements in debris collection bags for use with automatic pool cleaning devices, particularly of the type designed for submerged travel along the floor and subsurface sidewalls of a swimming pool to collect and dislodge debris. More particularly, this invention relates to an improved debris collection bag designed for improved operating efficiency in the collection of relatively large debris, such as leaves, twigs, and the like.

Residential and commercial swimming pools conventionally include water filtration systems designed for removing dirt and debris from the pool water. Such filtration systems include a circulation pump for pumping pool water through a filter unit which separates dirt and other suspended debris from the water, after which the pool water is returned to the swimming pool. To maintain desired standards of water cleanliness and clarity, such filtration systems are normally required to be operated on a daily schedule for at least several hours each day.

While a swimming pool filtration system of the type described above is essential for maintaining water cleanliness and clarity, such filtration systems by themselves are generally unable to maintain the pool water is a satisfactory state of cleanliness over a long period of time. For example, a conventional water filtration system is designed to remove suspended water-entrained debris of a relatively small size and generally not for removing larger debris, such as leaves and the like, or othe particulate matter which tends to settle irrespective of size onto the floor and sidewalls of a pool. Accordingly, periodic cleaning of the pool floor and sidewalls by additional means is required to maintain the pool in a clean condition.

In recent years, a variety of in-the-pool cleaning devices have become popular for dislodging and collecting debris and sediment from the floor and sidewalls surfaces of a swimming pool. See, for example, the pool cleaning device shown and described in U.S. Pat. No. 3,822,754 which is adapted for submerged and generally random travel along the pool floor and sidewalls, wherein such devices are exemplified by the pool cleaner manufactured and sold by Polaris Vac-Sweep of San Marcos, Calif., under the trademark POLARIS VAC-SWEEP. Cleaning devices of this type are designed for connection to a supply of water under pressure, such as by connection to the discharge side of a filtration system circulation pump, and are driven hydraulically over submerged pool surfaces to dislodge sediment and further include hydraulic suction means for drawing sediment and debris through a suction mast into a porous collection or filter bag.

In general, collection/filter bags for pool cleaners have been formed from a meshlike material sewn into a shape having a lower open mouth for attachment about the upper end of the pool cleaner suction mast. Accordingly, water drawn upwardly into the bag filters through the meshlike material for return to the pool, whereas water-entrained debris larger than the mesh openings is trapped and collected within the bag. However, in previous collection/filter bags, the debris has tended to collect generally within or near the open mouth of the bag thereby obstructing water flow through the suction mast and inhibiting cleaner effectivity. This problem can be particularly severe when the pool cleaner is used to collect relatively large debris, such as leaves, twigs, and the like, which have fallen into the pool during windy or stormy weather conditions. Moreover, debris collected within the mouth region of the bag tends to fall back through the suction mast into the swimming pool upon cessation of cleaner operation. Still further, previous collection/filter bags generally have been shaped with a relatively tall and broad front profile to result in significant drag as the bag and cleaner move together through the pool water, wherein this drag can tip the cleaner to prevent the desired hydraulic suction operation, especially when collecting relatively heavy debris. In addition, when the collected debris is emptied from the bag, it has generally been necessary to remove the bag from the pool cleaner resulting in potential debris spillage into interfering contact with cleaner drive mechanisms.

There exists, therefore, a significant need for an improved debris collection bag for pool cleaners wherein the collection bag is designed for improved hydraulic operating characteristics particularly with respect to debris such as leaves and the like and for facilitated bag emptying without requiring bag removal from the pool cleaner.

SUMMARY OF THE INVENTION

In accordance with the invention, an improved debris collection bag is provided for use with in-the-pool swimming pool cleaners and the like for improved operational efficiency particularly in collection of relatively large debris, such as leaves, twigs, and the like, and for facilitated removal of collected debris from within the bag. The improved collection bag is sewn from a relatively open mesh fabric material to include a lower open mouth for inflow of water and debris suctioned by the pool cleaner and a rearwardly disposed collection chamber for collecting and storing the debris. A split seam at a lower rear portion of the collectin bag is normally closed during pool cleaner operation but is releasably separable to provide a discharge opening through which collected debris can be emptied without requiring bag removal from the pool cleaner.

In one preferred form of the invention, the improved collection bag is formed from a single elongated stretch of a relatively open mesh fabric, such as nylon or the like, folded upon itself to define left and right bag sidewalls of generally conforming shape. These bag sidewalls are seamed together along overlapping margins at one end of the bag and further along overlapping longitudinal margins to define an open mouth at the opposite end of the bag. In addition, portions of the left and right sidewalls generally intermediate the bag ends are gathered and seamed to shape the bag into a generally L-shaped configuration. Mounting means at the bag open mouth faciliate mounting about or onto the discharge end of a pool cleaner suction mast in a position with a bag forward leg extending upwardly and blending into a generally horizontal rear leg.

In use, water and debris suctioned upwardly through the pool cleaner suction mast flow upwardly through a forward flow chamber defined by the forward bag leg. The water flow continues upwardly through the open mesh fabric for return to the pool, whereas the debris is guided rearwardly into a rear collection chamber within the bag rear leg. A suspension strap is provided for supporting the bag rear leg below a water supply hose for the pool cleaner to maintain the generally L-shaped bag configuration notwithstanding the weight of debris within the collection chamber. The split seam extends along a rear and/or lower portion of the collection chamber and preferably comprises Velcro-type fastener strips which can be separated as desired to define the discharge opening through which collected debris can be emptied from the bag.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
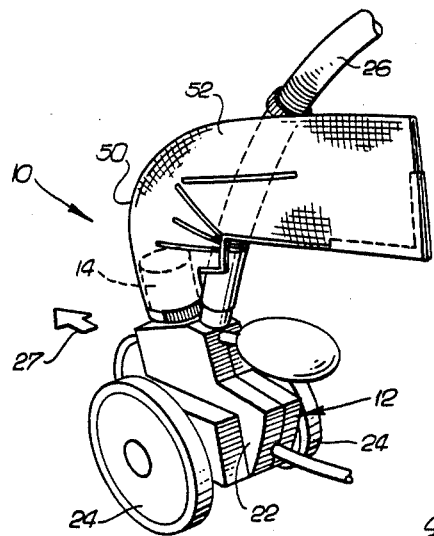
FIG. 1 is a perspective view of an in-the-pool cleaner having mounted thereon an improved debris collection bag embodying the novel features of the invention.

As shown in the exemplary drawings, an improved collection bag referred to generally by the reference numeral 10 is provided for use with an in-the-pool cleaner 12 of the type designed for generally random travel over the floor and sidewall surfaces of a swimming pool (not shown) or the like. The improved debris collection bag 10 is removably mounted onto the upper end of a suction mast 14 of the pool cleaner 12 for receiving a flow of water with entrained debris, particularly such as leaves, twigs, and the like, suctioned from submerged pool surfaces. The collected debris flows upwardly within the collection bag 10 through a forward flow chamber 16 and then guides rearwardly into a rear collection chamber 18 for collection and storage.

The improved debris collection bag 10 of the present invention provides significant improvements in operation and use in comparison with previous debris bags used with pool cleaners of a generally similar type. More particularly, in the improved collection bag 10, debris of a relatively large size, such as leaves, twigs, and the like, are collected from within a swimming pool and stored within the rear collection chamber 18 in a position within the bag which avoids interference with hydraulic water flow through the suction mast 14. Accordingly, substantially optimum suction flow characteristics for the pool cleaner are maintained at all times for substantially optimizing overall cleaner efficiency. Moreover, the improved collection bag 10 is shaped with a relatively narrow, substantially minimum front profile and overall height to correspondingly minimize hydraulic drag within the pool water during cleaner movement, wherein such drag can otherwise cause partial tipping of the pool cleaner 12 to interfere with debris suction capability. Furthermore, debris collected within the rear chamber 18 can be emptied therefrom quickly and easily through a rear discharge opening 20 (FIG. 5) without requiring bag removal from the pool cleaner and further substantially without spillage of collected debris onto the pool cleaner.

The improved debris collection bag 10 shown in FIGS. 1-5 is designed particularly for use with pool cleaners of the type shown and described, for example, in U.S. Pat. No. 3,822,754, wherein such cleaner devices are exemplied by the pool cleaner maufactured and sold by Polaris Vac-Sweep of San Marcos, Calif., under the trademark POLARIS VAC-SWEEP. In such pool cleaners, with reference to the illustrative cleaner 12, a cleaner housing 22 is supported on a set of wheels 24 for rolling transport in a generally random pattern over the floor and submerged sidewall surfaces of a swimming pool. An hydraulic drive train (not shown) encased within the cleaner housing 22 responds to a supply of water under pressure coupled through a supply hose 26 to drive the wheels 24 relatively slowly in a forward direction, as illustrated by arrow 27. In addition, a portion of the water from the supply hose 26 is utilized to induce a suction flow upwardly through the cleaner suction mast 14, wherein this suction flow draws water along with debris, such as leaves and the like, from pool surfaces underlying the cleaner housing 22 for upward flow into the collection bag 10. One exemplary construction for the hydraulic drive train and suction flow inducement means is shown and described in detail in the above-referenced U.S. Pat. No. 3,822,754, which is incorporated by reference herein. An alternative improved pool cleaner construction including hydraulic drive and suction flow inducement means is shown and described in detail in commonly assigned U.S. application Ser. No. 574,293, filed Jan. 26, 1984, which is also incorporated herein by reference.

Figure 2:
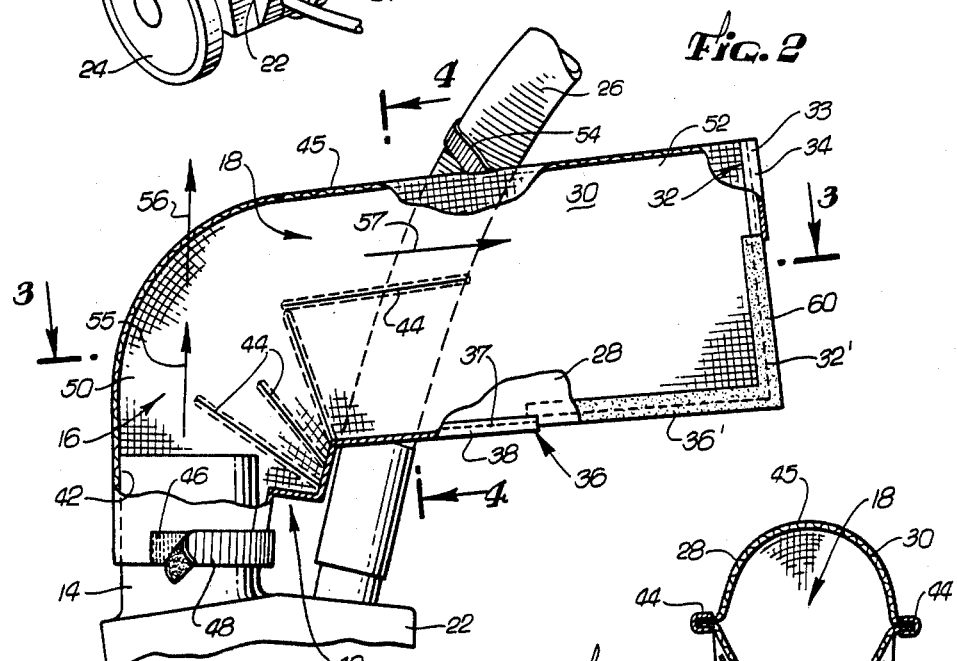
FIG. 2 is an enlarged fragmented side elevation view of the improved collection bag installed on the pool cleaner, illustrating the collection bag partially in vertical section.
Figure 4:
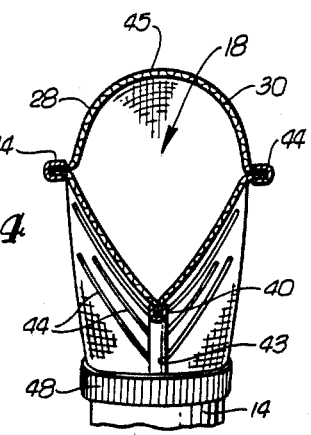
FIG. 4 is a substantially vertical sectional view taken generally on the line 4—4 of FIG. 2.
Figure 3:
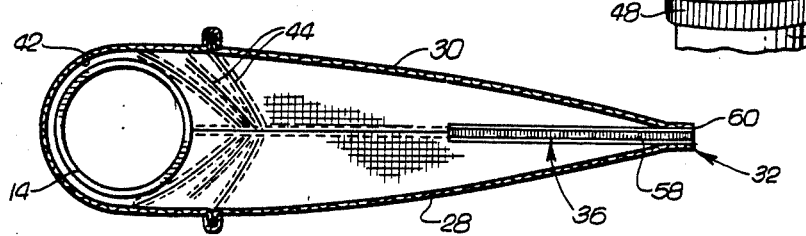
FIG. 3 is a substantially horizontal sectional view taken generally on the line 3—3 of FIG. 2.

As shown best in FIGS. 2-4, the improved debris collection bag 10 is formed preferably from a single elongated stretch of a porous, relatively open mesh fabric material, such as nylon or the like, with the mesh size being chosen in accordance with the desired debris particle size to be collected, and with the collection bag 10 of the present invention being particularly adapted for collecting relatively large and heavy debris. The fabric material is folded upon itself to define left and right sidewalls 28 and 30 of a conforming size and shape with generally aligned, overlapping end and longitudinal margins. These overlapping margins are joined together at one end of the bag by a rear seam 32 to close said bag one end, and this rear seam 32 which may include stitching 33 and a stitched-in reinforcing strip 34 of a fabric such as cotton or the like. The overlappng side margins are also joined together by a longitudinal seam 36 which may include stitching 37 and a stitched-in reinforcing fabric strip 38. This longitudinal seam extends generally from the rear seam 32 at the rear end of the bag toward the opposite or forward end of the bag and terminates in a short inset section 40 disposed a short distance from the forward bag end. Portions of the bag left and right sidewalls 28 and 30 protruding beyond the inset seam section 40 define an open mouth 42 of generally cylindrical shape with a short longitudinal split 43 (FIG. 4) adjacent the seam inset section 40.

In addition, the left and right sidewalls 28 and 30 of the collection bag 10 include intermediately disposed gathers 44 of an appropriate size and shape, wherein these gathers are suitably stitched to provide the collection bag with a generally L-shaped configuration. Importantly, the positions and directional orientations of the gathers 44 are chosen to place the longitudinal seam 36 along the inboard margin of the L-shaped configuration. This provides the bag 10 with a seamless outboard margin 45 for improving hydraulic operating efficiency, as will be described in more detail.

The collection bag 10 is installed onto the discharge end of the pool cleaner suction mast 14 by placement of the bag open mouth 42 about or otherwise in open alignment with the suction mast 14. In this regard, in the illustrative bag shown in FIGS. 1–5, the longitudinal split 43 between the sidewalls 28 and 30 permits rapid and easy placement of the bag mouth 42 in encircling relation about the suction mast 14. When so placed, the mouth 42 is releasably secured onto the mast 14 by mounting means including appropriate fastening means, such as interengageable hook and pile Velcro-type flaps 46 and 48 sewn respectively onto the sidewalls 28 and 30.

When installed onto the suction mast 14 of the pool cleaner 12, the generally L-shaped bag is oriented to define a relatively short, upright forward bag leg 50 disposed over the suction mast 14 and defining the forward flow chamber 16. This forward bag leg 50 merges smoothly at a location shortly above the suction mast 14 into a generally horizontally disposed and rearwardly trailing rear bag leg 52. Accordingly, the upper region of the forward flow chamber 16 correspondingly merges smoothly into the rear collection chamber 18 defined within the rear bag leg 52. Importantly, the trailing orientation of the rear bag leg 52 is closely aligned with the direction of cleaner travel, depicted by arrow 27 in FIG. 1, and the rear seam 32 is oriented generally in a vertical plane, all contributing to substantially minimize the front profile of the bag to correspondingly minimize hydraulic drag during cleaner operation. A suspension strap 54 of attachable Velcro-type strips or the like is secured to the bag rear leg 52 for supporting the rear leg 52 from and below the water supply hose 26 to help maintain the low-profile bag orientation during operation, wherein this strap 54 can be connected as by stitching to a midpoint along the upper margin 45 or to any other convenient location on the bag.

In use, water and debris suctioned upwardly through the cleaner suction mast 14 enters the primary flow chamber 16 within the bag forward leg 50 with an upward component of movement, as depicted by arrow 55 in FIG. 3. The water flow continues upwardly through the forward flow chamber 16 and passes substantially without hydraulic interruption through the open mesh fabric at the seamless bag upper margin 45 for return to the pool, as illustrated by arrows 56. The entrained debris, however, guides and tumbles rearwardly incident to forward travel of the pool cleaner 12 through the swimming pool for collection and storage within the rear collection chamber 18, as illustrated by arrows 57. Accordingly, the debris is collected in an out-of-the-way position where it does not interfere with water flow through the suction mast 14 thereby avoiding interference with hydraulic operation of the pool cleaner. As the rear collection chamber 18 fills with debris, the suspended orientation of the rear bag leg 52 below the water supply hose 26 helps to prevent any significant folding or collapse of the bag which might otherwise interfere with bag collection capability.

Figure 5:
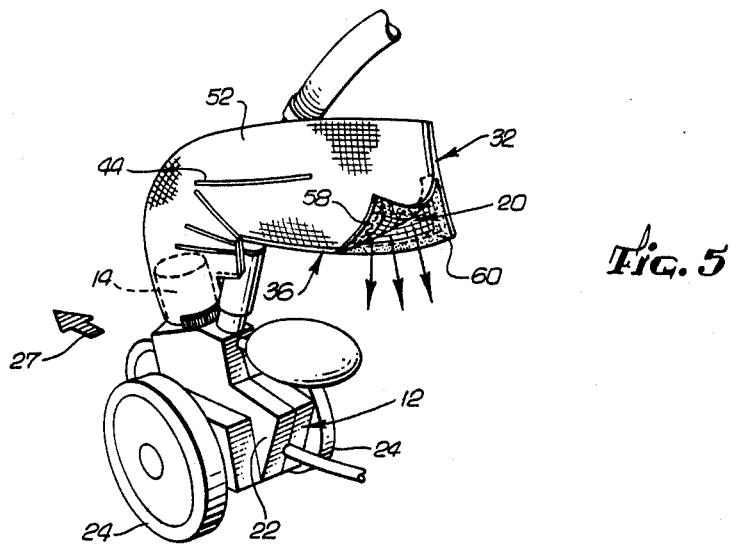
FIG. 5 is a fragmented perspective view similar to a portion of FIG. 1 and illustrating removal of collected debris from within the improved collection bag.

In accordance with one major aspect of the improved collection bag 10, the rear collection chamber 18 is accessible via the discharge opening 20 to empty collected debris directly and easily into an appropriate collection vessel (not shown) without requiring removal of the collection bag from the pool cleaner and further with little or no risk of spilling collected debris onto the pool cleaner. In the illustrative embodiment, portions of the rear seam 32 and a continuous portion of the longitudinal seam 36 are split into separable subseams 32' and 36' extending along the bag margins and securing fastening means, such as interengageable Velcro-type strips 58 and 60, respectively, to the bag sidewalls 28 and 30. As shown, these fastener strips 58 and 60 thus have an overlapping L-shaped configuration at the lower rear of the collection chamber 18. The fastener strips 58 and 60 are engaged with one another to close the discharge opening 20 during a debris collection cycle but may be opened quickly and easily, as shown in FIG. 5, to permit debris emptying through the discharge opening 20. After the debris has been removed, the strips 58 and 60 are quickly and easily reengaged to close the discharge opening 20 for subsequent debris collection operation.

Figure 6:
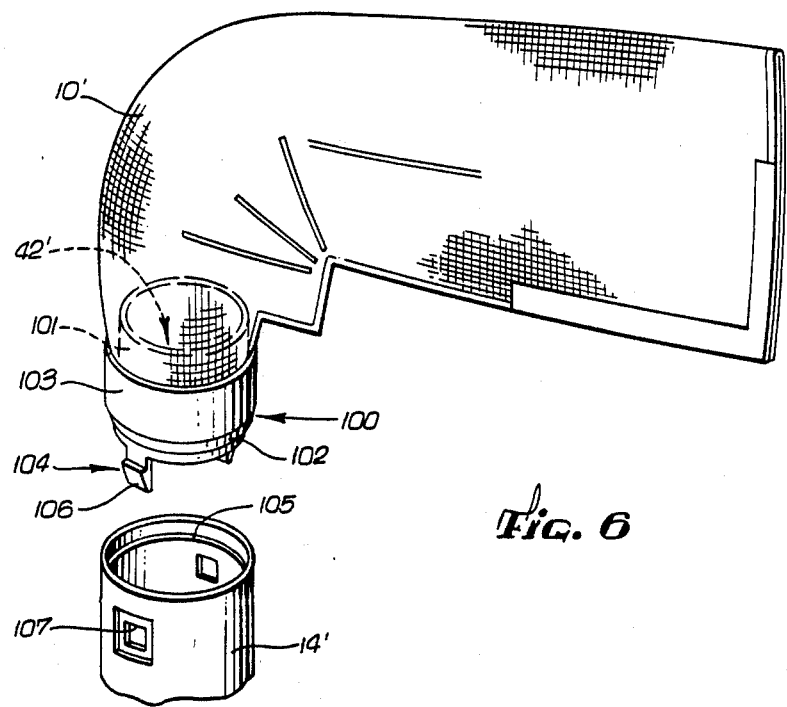
FIG. 6 is an enlarged fragmented perspective view illustrating a portion of an alternative form of the improved collection bag including alternate means for mounting onto a pool cleaner.

FIG. 6 illustrates an alternate form of the improved collection bag of the present invention, wherein the collection bag has been modified to include alternate mounting means for mounting onto the suction mast of a pool cleaner, with components corresponding to those shown and described in FIGS. 1–5 being referred to by common reference numerals. More specifically, as shown, the open lower mouth 42' of the alternate collection bag 10' is secured to a mounting ring 100 designed for rapid and simplified installation and/or removal with respect to the upper end of a modified suction mast 14' of the type shown and described in commonly assigned U.S. application Ser. No. 574,293, filed Jan. 26, 1984. This mounting ring 100 comprises an upstanding support cylinder 101 which projects upwardly a substantial distance within the lower open mouth 42' of the collection bag. This support cylinder 101 has a lower end joined to an enlarged flange 102, with the bag drawn over the support cylinder 101 into a position near or abutting the flange 102, after which an outer locking sleeve 103 is snugly seated about the bag and support cylinder 101 to lock the bag in place. A suitable adhesive may be provided between the sleeve 103 and the support cylinder 101 to permanently secure the bag, if desired.

Below the flange 102, the mounting ring 100 is shaped for sliding reception into a shallow counterbore 105 at the upper end of the suction mast 14' and further into flush annular supported engagement with the lower extent of the counterbore. A pair of latch clips 104 project downwardly from the mounting ring 100 beyond the counterbore and terminate in outwardly presented and downwardly pointed wedge plates 106. These latch clips are designed for resilient displacement toward each other for reception of the wedge plates 106 downwardly into the suction mast upper end, followed by resilient outward movement for locked and seated reception into matingly shaped openings 107 formed near the upper end of the suction mast. Accordingly, the mounting ring can be installed rapidly onto the suctin mast and further may be removed easily by mere inward depression on the wedge plates 106 followed by separation of the mounting ring 100 and bag 101 from the suction mast.

The improved collection bag of the present invention thus provides for collection of debris, particularly such as leaves, twigs, and the like in a rearwardly disposed position spaced away from water flow through the suction mast of the pool cleaner, thereby avoiding hydraulic interference with pool cleaner operation. Moreover, the improved collection bag provides a relatively low profile when moving through the water to further enhance hydraulic cleaner operation. The improved collection bag also incorporates simplified means for emptying collected debris without requiring bag removal from a pool cleaner.

A variety of further modifications and improvements to the improved collection bag described herein are believed to be apparent to those of ordinary skill in the art. For example, it should be understood that the location of the discharge opening 20 may be disposed entirely along the rear seam 32 or entirely along the longitudinal seam 36 in lieu of the generally L-shaped preferred configuration shown in the exemplary drawings. Accordingly, no limitation upon the invention is intended by way of the preferred descriptions herein, except as set forth in the appended claims.

What is claimed is:

1. A debris collection bag incombination with a pool cleaner having a water supply hose, a suction mast, and means for drawing water and debris from a swimming pool or the like through the suction mast, said collection bag comprising:
   a pair of elongaged sidewalls of generally common shape and formed from a material pervious to water flow and generally impervious to passage of debris of selected size, said sidewalls being joined seamlessly along a first longitudinal margin and having a generally aligned second longitudinal margin and generally aligned end margins;
   means for interconnecting said sidewalls along said second longitudinal margin and along one of said end margins, said interconnecting means being releasably separable over a portion thereof spaced from the other of said end margins to define a discharge opening;
   mounting means cooperating with the other of said end margins to define an open mouth for mounting onto the discharge end of the pool cleaner suction mast for flow of water and debris through the suction mast into the bag between said sidewalls;
   means for shaping said sidewalls into a generally L-shaped configuration including a generally upright forward bag leg having said open mouth at the lower end thereof and joined at its upper end to a generally horizontal rear bag leg, said first and second longitudinal margins respectively defining the outboard and inboard longitudinal margins of said L-shaped configuration;
   said forward bag leg defining a forward flow chamber for reception of water and debris flowing through said open mouth with the water exiting the bag generally through said outboard margin and the debris passing into a collection chamber defined by said rear bag leg for collection and storage; and
   means for supporting said rear bag leg from the water supply hose.

2. The debris collection bag of claim 1 wherein said shaping means comprises gather seams formed in said sidewalls.

3. The debris collection bag of claim 1 wherein said sidewall material is a relatively open mesh fabric.

4. The debris collection bag of claim 1 wherein said sidewalls are formed from an elongated stretch of the material folded upon itself to define said seamless first longitudinal margin.

5. The debris collection bag of claim 1 wherein said mounting means includes means for releasably securing said bag about the pool cleaner suction mast.

6. The debris collection bag of claim 5 wherein said releasable securing means comprises an attachable pair of Velcro-type fastener strips.

7. The debris collection bag of claim 5 wherein said releasable securing means comprises a generally cylindrical member secured to said sidewalls generally adjacent said open mouth, and at least one latch clip projecting from said cylindrical member and springably movable for releasable attachment with the pool cleaner suction mast.

8. The debris collection bag of claim 1 wherein said interconnecting means is releasably separable generally over at least a portion of said one end margin.

9. The debris collection bag of claim 1 wherein said interconnecting means is releasably separable generally over a portion of said second longitudinal margin disposed generally adjacent said one end margin.

10. The debris collection bag of claim 1 wherein said interconnecting means is releasably separable generally over adjacent portions of said one end margin and said second longitudinal margin.

11. The debris collection bag of claim 1 wherein said interconnecting means comprises an attachable pair of fastener strips releasably separable to define the discharge opening.

12. The debris collection bag of claim 1 wherein said supporting means suspends said rear bag leg below the water supply hose.

13. The debris collection bag of claim 12 wherein said supporting means comprises a suspension strap mounted generally intermediate the length of said rear bag leg.

14. A debris collection bag incombination with a pool cleaner having a water supply hose, a suction mast, and means for drawing water and debris from a swimming pool or the like through the suction mast, said collection bag comprising:
   an elongated bag member formed from a material pervious to water flow and generally imprevious to passage of debris of selected size, said bag member defining a substantially normally closed interior and having an open mouth at one end thereof;
   means for mounting said one end of said bag member onto the discharge end of the pool cleaner suction mast for passage of water and debris drawn through the suction mast through said open mouth into the interior of said bag member;
   means for shaping said bag member into a generally L-shaped configuration including a generally upright forward bag leg having said open mouth at the lower end thereof and joined at its upper end to a generally horizontal rear bag leg, said forward bag leg defining a forward flow chamber for reception of water and debris flowing through said open mouth with the water exiting the bag generally through said bag member and the debris passing into a collection chamber defined by said rear bag leg for collection and storage; and means for releasably accessing said collection chamber from the exterior of said bag member at a position spaced from said open mouth to permit removal of collected debris.

15. The debris collection bag of claim 14 wherein said shaping means comprises gather seams formed in said bag member.

16. The debris collection bag of claim 14 wherein said bag member materials is a relatively open mesh fabric.

17. The debris collection bag of claim 14 further including means for suspending said rear bag leg from the water supply hose.

18. A debris collection bag incombination with a pool cleaner having a water supply hose, a suction mast, and means for drawing water and debris from a swimming pool or the like through the suction mast, said collection bag comprising:

a pair of elongated sidewalls of generally common shape and formed from a material pervious to water flow and generally impervious to passage of debris of selected size, said sidewalls being joined seamlessly along a first longitudinal margin and having a generally aligned second longitudinal margin and generally aligned end margins;

means for interconnecting said sidewalls along said second longitudinal margin and along one of said end margins, said interconnecting means including a stitched seam and a pair of releasably separable fastener strips for defining a discharge opening, said fastener strips being disposed generally adjacent said one end margin;

mounting means cooperating with the other of said end margins to define an open mouth for mounting onto the discharge end of the pool cleaner suction mast for flow of water and debris through the suction mast into the bag between said sidewalls;

a plurality of gather seams for shaping said sidewalls into a generally L-shaped configuration including a generally upright forward bag leg having said open mouth at the lower end thereof and joined at its upper end to a generally horizontal rear bag leg, said first and second longitudinal margins respectively defining the outboard and inboard longitudinal margins of said L-shaped configuration;

said forward bag leg defining a forward flow chamber for reception of water and debris flowing through said open mouth with the water exiting the bag generally through said outboard margin and the debris passing into a collection chamber defined by said rear bag leg for collection and storage; and a suspension strap secured to the bag generally along said bag rear leg for releasably suspending said bag rear leg below the water supply pipe in a position extending generally rearwardly from the pool cleaner suction mast.

* * * * *